(12) United States Patent
Garcia et al.

(10) Patent No.: US 8,166,752 B2
(45) Date of Patent: May 1, 2012

(54) APPARATUS AND METHOD FOR COOLING AN EXHAUST GAS

(75) Inventors: Linda Garcia, Royal Oak, MI (US); Charles E. Freese, V, Ira Township, MI (US); Adam Vosz, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 594 days.

(21) Appl. No.: 12/323,718

(22) Filed: Nov. 26, 2008

(65) Prior Publication Data

US 2010/0126155 A1 May 27, 2010

(51) Int. Cl.
*F01N 3/02* (2006.01)
*F01N 3/00* (2006.01)

(52) U.S. Cl. ............... 60/308; 60/315; 60/316; 60/317; 60/319; 60/771

(58) Field of Classification Search .............. 60/308, 60/315, 316, 317, 319, 771
See application file for complete search history.

(56) References Cited

U.S. PATENT DOCUMENTS

| | | | | |
|---|---|---|---|---|
| 3,857,458 A * | 12/1974 | Ohtani et al. | ............... | 181/262 |
| 4,638,632 A * | 1/1987 | Wulf et al. | ............... | 60/319 |
| 7,207,172 B2 * | 4/2007 | Willix et al. | ............... | 60/317 |
| 7,281,530 B2 * | 10/2007 | Usui | ............... | 123/568.17 |
| 7,628,012 B2 * | 12/2009 | Eifert et al. | ............... | 60/319 |
| 7,645,432 B1 * | 1/2010 | Solomon | ............... | 423/212 |
| 7,833,301 B2 * | 11/2010 | Schindler et al. | ............... | 55/385.3 |
| 7,845,465 B2 * | 12/2010 | Baumgartner | ............... | 181/249 |
| 2007/0119985 A1 * | 5/2007 | Ranganathan et al. | ............... | 239/398 |
| 2008/0110164 A1 * | 5/2008 | Angoshtari et al. | ............... | 60/324 |
| 2008/0196408 A1 * | 8/2008 | Li et al. | ............... | 60/605.2 |
| 2009/0173077 A1 * | 7/2009 | Lynch et al. | ............... | 60/771 |

* cited by examiner

*Primary Examiner* — Kenneth Bomberg
*Assistant Examiner* — Matthew T Largi
(74) *Attorney, Agent, or Firm* — Cantor Colburn LLP

(57) ABSTRACT

An exhaust gas cooling apparatus and method for cooling an exhaust gas is provided. The exhaust cooling apparatus having a first fluid conduit having a variable nozzle opening disposed at one end of the first fluid conduit, the variable nozzle opening being defined by a shape memory alloy extending from the first fluid conduit; and a second fluid conduit having an inlet end and an outlet end, the variable nozzle opening being disposed in the second fluid conduit proximate to the inlet end of the second fluid conduit such that a fluid inlet opening is disposed about an outer periphery of the variable nozzle opening and an inner surface of the inlet end of the second fluid conduit, the shape memory alloy varying the size of the variable nozzle opening by moving toward or away from a center line of the first fluid conduit in response to a temperature of an exhaust gas flowing through the first fluid conduit.

12 Claims, 3 Drawing Sheets

APPARATUS AND METHOD FOR COOLING AN EXHAUST GAS

FIELD OF THE INVENTION

Exemplary embodiments of the present invention are related to a fluid entrainment apparatus and, more specifically, to a fluid entrainment apparatus to cool an exhaust gas.

BACKGROUND

Manufacturers of vehicles that employ internal combustion engines, more particularly diesel engines, are under increased pressure to comply with current and future emission standards for the release of oxides of nitrogen ($NO_x$), particularly nitrogen monoxide (NO), as well as unburned and partially oxidized hydrocarbons (HC), carbon monoxide (CO), particulate matter, and other emissions, such as hydrogen sulfide ($H_2S$) and ammonia ($NH_3$). In order to reduce the previously mentioned emissions of a diesel engine, the diesel engine is typically operated with exhaust gas after-treatment system or systems through which the exhaust gas of the diesel engine flows and is treated.

Exhaust gas after-treatment systems typically include one or more after-treatment devices, such as oxidation catalysts, $NO_x$ abatement devices, diesel particulate filters (DPFs) and sulfur traps. These after-treatment devices generally require certain conditions to exist in the engine exhaust gas in order to perform optimally. More specifically, $NO_x$ abatement devices and oxidation catalysts, for example, have a relatively narrow temperature window within which the devices are activated, regenerated, or operate with high conversion efficiency. Periodically, after-treatment devices require heating of the exhaust gases and the device to temperatures that are higher than those typically provided by the engine in order to achieve the desired operating temperature of the after-treatment device. An example of one such device is a diesel particulate filter.

Modern compression ignition engines typically use exhaust after-treatment devices as a mechanism to satisfy stringent emission requirements. Some compression ignition engine exhaust after-treatment systems employ diesel particulate filters (DPF) or other devices, which elevate exhaust gas temperatures, in order to accomplish their function. In a DPF, this typically occurs during regeneration modes. There are two primary regeneration events for a DPF: passive and active. During passive regeneration, exhaust gases reach sufficient temperatures to promote catalytic reactions that oxidize trapped soot. In active regeneration modes, the onboard engine control module forces the engine to increase exhaust gas temperatures and/or regulate available oxygen content to either promote or halt a regeneration event. Regeneration events typically require exhaust temperatures between 570 and 650 degrees Celsius. When undergoing regeneration, exhaust gas temperatures must be managed, such as to avoid excessively high tailpipe gas temperatures. This becomes particularly important when the vehicle comes to a stop, while in regeneration mode. Most vehicle producers use a combination of software control strategies and mechanical devices to limit tailpipe exhaust gas temperatures.

Additionally, DPFs periodically require a relatively high concentration of oxygen in the exhaust gas to facilitate regeneration of the particulate filter. Often, the required exhaust gas conditions cannot always be achieved during normal operation of the engine. More particularly, the exhaust gas temperature can only be influenced to a certain degree by the combustion process without the use of a source of supplemental heat, such as an electric heater in the exhaust-gas stream. The particulate matter can generally be characterized as soot that is captured and reduced by a DPF. Present DPFs contain a separation medium with tiny pores that capture the soot particles. Resistance to exhaust flow in the DPF increases as trapped material accumulates in the DPF, thereby generating an increase in exhaust backpressure. The DPF must then be regenerated to burn off the particulate matter/soot in the particulate trap to reduce the exhaust backpressure and increase exhaust flow through the DPF. A typical method of regenerating a DPF utilizes an energy source such as a burner or electric heater to encourage combustion of the particulate matter. Particulate combustion in a DPF has been found to increase the temperature of the exhaust gas exiting the vehicle tailpipe downstream of the DPF.

Accordingly, it is desirable to provide a method and apparatus for cooling the higher temperature exhaust gas after it has exited the DPF or any other equivalent device without adversely affecting the engine performance.

SUMMARY OF THE INVENTION

In one exemplary embodiment of the present invention, an exhaust gas cooling apparatus is provided, the exhaust gas cooling apparatus having a first fluid conduit; a variable nozzle opening disposed at one end of the first fluid conduit, the variable nozzle opening being defined by a shape memory alloy extending from the first fluid conduit; and a second fluid conduit having an inlet end and an outlet end, the variable nozzle opening being disposed in the second fluid conduit proximate to the inlet end of the second fluid conduit such that a fluid inlet opening is disposed about an outer periphery of the variable nozzle opening and an inner surface of the inlet end of the second fluid conduit, the shape memory alloy varying the size of the variable nozzle opening by moving toward or away from a center line of the first fluid conduit in response to a temperature of an exhaust gas flowing through the first fluid conduit.

In another exemplary embodiment of the present invention, a method for cooling an exhaust gas of an exhaust treatment device of an engine is provided, the method comprising: directing the exhaust gas through a first fluid conduit having a variable nozzle opening defined by a shape memory alloy extending from the first fluid conduit, the variable nozzle opening being received in an inlet end of a second fluid conduit, the variable nozzle opening being disposed in the second fluid conduit proximate to the inlet end of the second fluid conduit such that a fluid inlet opening is disposed about an outer periphery of the shape memory alloy and an inner surface of the inlet end of the second fluid conduit; introducing another gas into the second fluid conduit though the fluid inlet opening, the another gas having a temperature lower than that of the exhaust gas; mixing the another gas with the exhaust gas in the second fluid conduit to provide a mixed gas, the mixed gas having a temperature less than that of the exhaust gas; and varying a size of the variable nozzle opening by moving the shape memory alloy toward or away from a center line of the first fluid conduit in response to a temperature of the exhaust gas flowing through the first fluid conduit.

In yet another exemplary embodiment of the present invention, an exhaust system for a vehicle is provided, the exhaust system comprising: an exhaust pipe for receiving an exhaust gas of an engine of the vehicle; an exhaust cooling apparatus for cooling the exhaust gas, the exhaust cooling apparatus comprising: a first fluid conduit; a variable nozzle opening disposed at one end of the first fluid conduit, the variable nozzle opening being defined by a shape memory alloy extending from the first fluid conduit; and a second fluid conduit having an inlet end and an outlet end, the variable nozzle opening being disposed in the second fluid conduit proximate to the inlet end of the second fluid conduit such that a fluid inlet opening is disposed about an outer periphery of the variable nozzle opening and an inner surface of the inlet end of the second fluid conduit, the shape memory alloy varying the size of the variable nozzle opening by moving toward or away from a center line of the first fluid conduit in response to a temperature of an exhaust gas flowing through the first fluid conduit.

In accordance with an exemplary embodiment of the present invention the first fluid conduit is configured for attachment to an exhaust pipe of a vehicular exhaust system and the first fluid conduit receives an exhaust gas and a second fluid (e.g., cooler ambient air) is mixed with the exhaust gas as it passes through the cooling apparatus of exemplary embodiments of the present invention.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

In accordance with an exemplary embodiment of the present invention an exhaust gas cooling apparatus is provided. In one exemplary embodiment, the exhaust gas cooling apparatus utilizes a variable orifice venturi to introduce cooling gases into an exhaust gas of an engine. In one exemplary embodiment, the variable orifice venturi is used to cool an exhaust gas of an after-treatment device of the engine.

In accordance with an exemplary embodiment of the present invention, the variable orifice venturi is disposed downstream from an exhaust of an after-treatment device and upstream from an exit of the exhaust system (e.g., exhaust into ambient air). The variable orifice venturi uses a nozzle upstream of the exit of the exhaust pipe or system, which empties into a larger pipe, in order to produce a venturi.

The variable orifice venturi expands and contracts to introduce cooling gases into the exhaust stream as well as increase a velocity of the exhaust gas exiting the nozzle of the conduit fluidly coupled to the exhaust after-treatment device. In accordance with an exemplary embodiment of the present invention the variable orifice venturi is provided to reduce the nozzle opening only during a desired event (e.g., gases of a particular temperature range exiting the exhaust treatment device) such that the increased back pressure created with the smaller nozzle opening is only provided during these events when exhaust gas cooling is required and thus, the smaller nozzle opening is not provided during all vehicle operating conditions, thus increasing the overall efficiency of the system.

In an exemplary embodiment, the variable nozzle venturi provides exhaust gas cooling, without requiring complex moving parts, expensive actuators, and/or computer controlled algorithms since the variable openings are achieved without adding more complex active computer controlled valve devices that also necessitate complex OBD2 diagnostic routines that may also require additional sensors to monitor performance of the device. In addition, the variable nozzle venturi cooler reduces exhaust system backpressure during non-regeneration events for increased engine performance and powertrain fuel efficiency.

Figure 1:
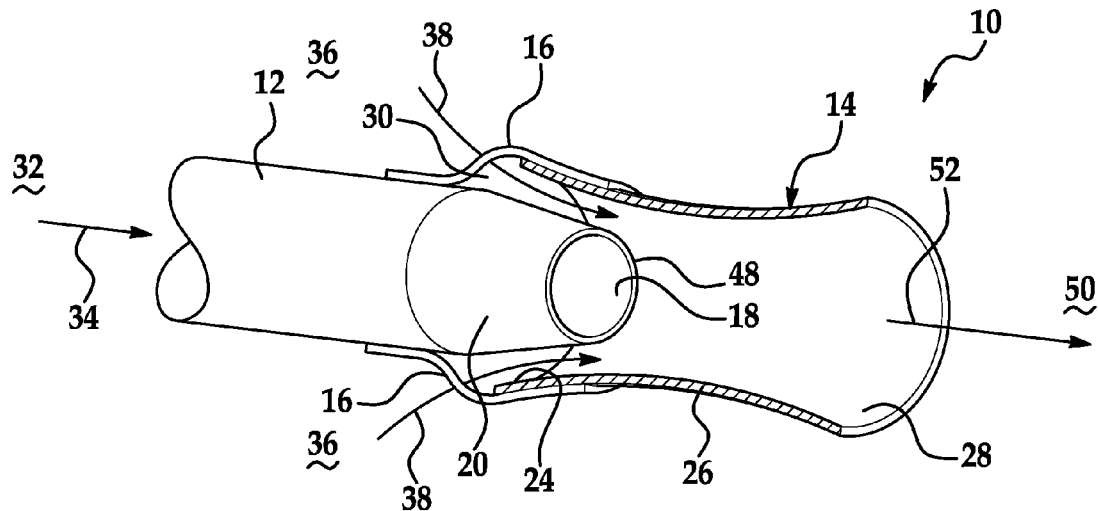
FIG. 1 is a partial cross-sectional view of an exhaust cooling device in accordance with an exemplary embodiment of the present invention.

Referring now to FIG. 1 an exhaust gas cooling apparatus 10 in accordance with an exemplary embodiment of the present invention is illustrated. The exhaust gas cooling apparatus has a first fluid conduit 12 and a second fluid conduit 14. The first fluid conduit is secured to the second fluid conduit by a plurality of securement members or stand offs 16, which are configured to provide flow paths to allow fluid flow into the second fluid conduit. The first fluid conduit is configured to receive an exhaust gas and has a nozzle 20 defining nozzle opening 18 positioned to direct the exhaust gas into the second fluid conduit.

In accordance with an exemplary embodiment of the present invention the nozzle opening is a variable nozzle opening that is capable of being reduced to a smaller opening (FIGS. 1, 3, 4 and 5) or expanded to a larger opening (FIG. 2) thus providing a variable opening. In accordance with an exemplary embodiment of the present invention the size of the variable opening is dependent upon the temperature of the exhaust gas flowing through the opening.

In accordance with an exemplary embodiment of the present invention the nozzle portion of the first fluid conduit is defined by a shape memory alloy. A temperature sensitive shape memory alloy allows the nozzle to provide a reduced diameter (and increased backpressure) to only be present when needed (e.g., during particulate filter regeneration).

A shape memory alloy, also referred to as a smart alloy, memory metal, or muscle wire is an alloy that "remembers" its shape. After the shape memory alloy has been deformed from its original crystallographic configuration, it regains its original geometry. In accordance with an exemplary embodiment of the present invention the shape memory alloy will be deformed when heated to a predetermined temperature and return to its original configuration after it has cooled below the predetermined temperature. Examples of shape memory alloys are copper-zinc-aluminum-nickel, copper-aluminum-nickel, and nickel-titanium (NiTi) alloys. The temperatures at which the shape memory alloys change configuration is a characteristic of the alloy and can be tuned by varying the elemental ratios in the alloy.

Figure 1A:
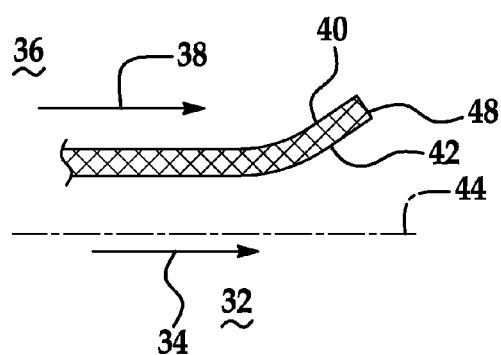
FIG. 1A is an enlarged cross-sectional view of a portion of the exhaust cooling device in a first position.

As discussed above and referring to FIGS. 1A and 1B, nozzle 20 is formed of a shape memory alloy 20 and disposed on or secured to an end of the first fluid conduit 12 and a distal end of the shape memory alloy defines the variable nozzle opening 18.

The shape memory alloy for the variable nozzle opening shall be selected, based upon its material properties, to achieve appropriate motion of distal end 48 of the shape memory alloy to vary the size of the nozzle opening based upon the temperature of a fluid flowing through the first conduit such that when the exhaust gas temperature increases and the ambient air (temperature and convecting cooling from motion around the exhaust cooling apparatus) are insufficient to cool the nozzle, the shape memory alloy defining the nozzle opening will deflect inward, reducing the diameter of the nozzle. This will promote a more effective venturi effect by accelerating the exhaust gas flow into the venturi and increasing the space for ambient air 38 to enter the venturi device. Thus, hot exhaust gas is diluted with cool ambient air in order to provide a diluted or cooled exhaust gas 50 in the direction of arrow 52. the cooling effect is achieved.

In an exemplary embodiment, this will occur under DPF regeneration events and would be most efficient when ambient air temperatures are high and the vehicle is not moving. These are conditions where the maximum amount of exhaust gas cooling is required since the exhaust gas would not be sufficiently cooled by heat dissipation into the ambient air.

On the other hand and when the ambient temperatures are cooler and/or the vehicle is moving (i.e. cooling air is moving across the tailpipe and exiting tailpipe gases cannot be concentrated on stationary devices) and/or the DPF is not in a regeneration mode (i.e. exhaust gases are cooler for example, less than 550 degrees Celsius), the nozzle orifice diameter will tend to increase thus reducing the back pressure on the system. The orifice diameter increase will be achieved by the shape memory alloy moving outward thus the effectiveness of the venturi is reduced and engine backpressure is reduced. For a compression ignition (lean burn) engine in a moving vehicle, this effect can reduce backpressure under a wide range of operating conditions, when exhaust gas cooling is not required. The reduced restriction will improve fuel efficiency and will permit the engine to achieve higher power/torque without exceeding various engine component operating limits.

As illustrated, the nozzle opening is located in an inlet end 24 of the second fluid conduit. The second fluid conduit has a central portion 26 disposed between the inlet end and an outlet end 28 of the second fluid conduit. As shown, an area of the opening in the central portion is smaller than the area of the opening at the inlet end and the outlet end and the second fluid conduit resembles a venturi tube. In accordance with an exemplary embodiment of the present invention the shape memory alloy is configured to vary the size of the nozzle opening which in turn varies an opening into the second fluid conduit and provides a variable orifice for the second fluid conduit.

Figure 1B:
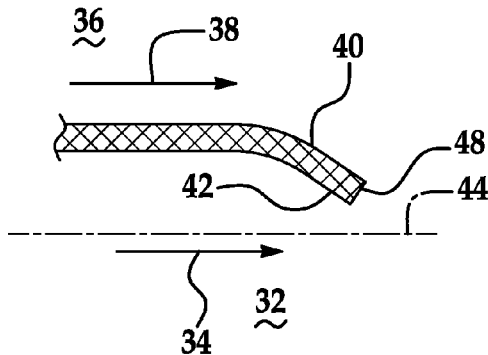
FIG. 1B is an enlarged cross-sectional view of a portion of the exhaust cooling device in a second position.

Referring now to FIGS. 1-4 and in accordance with an exemplary embodiment of the present invention, the shape memory alloy transitions between a first position (FIG. 1A) and a second position (FIG. 1B). See also FIGS. 2 and 3, which shows the shape memory alloy in the first position and the second position.

In an exemplary embodiment, the first position corresponds to a cool exhaust gas (e.g., less than 550 degrees Celsius) flowing through the first fluid conduit and the second position corresponds to a hotter exhaust gas (e.g., greater than 570 degrees Celsius) flowing through the first fluid conduit. It is, of course, understood that temperatures greater or less than the aforementioned temperatures are contemplated in accordance with exemplary embodiments of the present invention.

In a non-limiting exemplary embodiment the outer surface 40 contacts the second fluid conduit in the first position to substantially close the opening between the outer periphery of the first fluid conduit or variable nozzle and the inner periphery of the opening of the second fluid conduit. Alternatively, the outer surface of the shape memory alloy does not contact the second fluid conduit in the first position however, the opening between the outer periphery of the first fluid conduit and the inner periphery of the second fluid conduit remains substantially closed.

Figure 2:
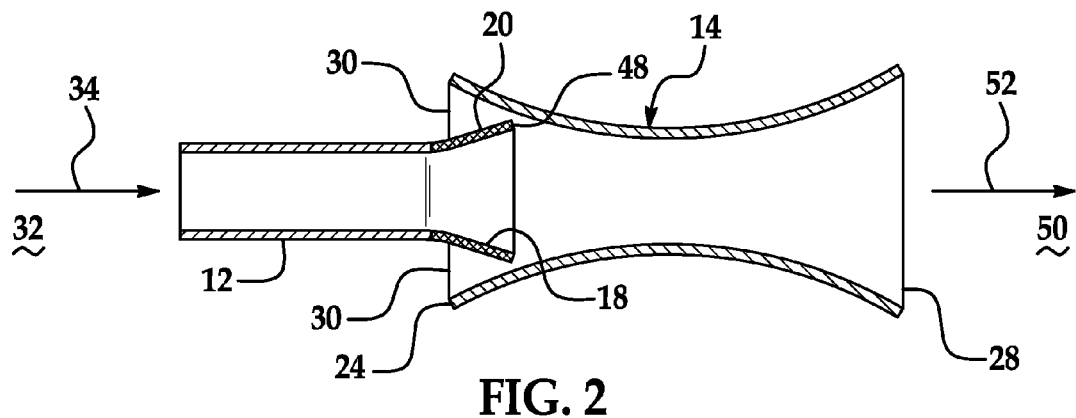
FIG. 2 is a cross-sectional view of the exhaust cooling device in a first operational position.
Figure 3:
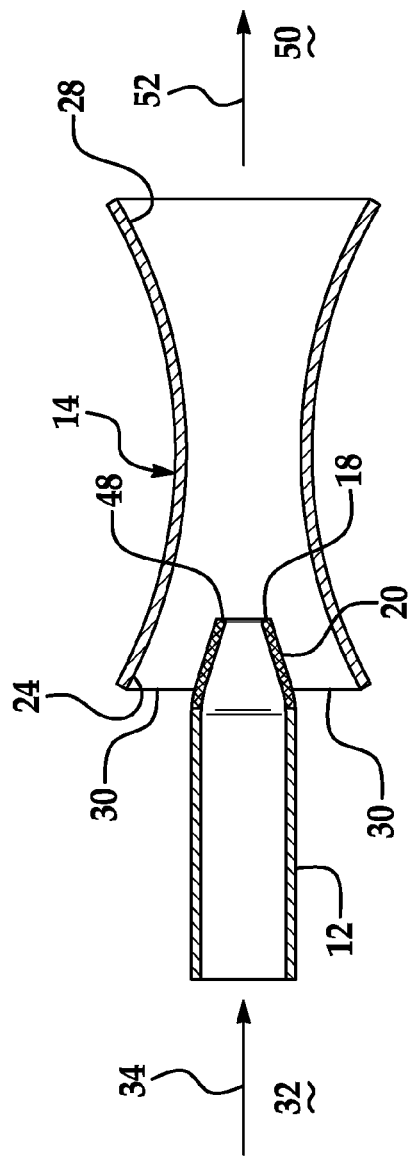
FIG. 3 is a cross-sectional view of the exhaust cooling device in a second operational position.
Figure 4:
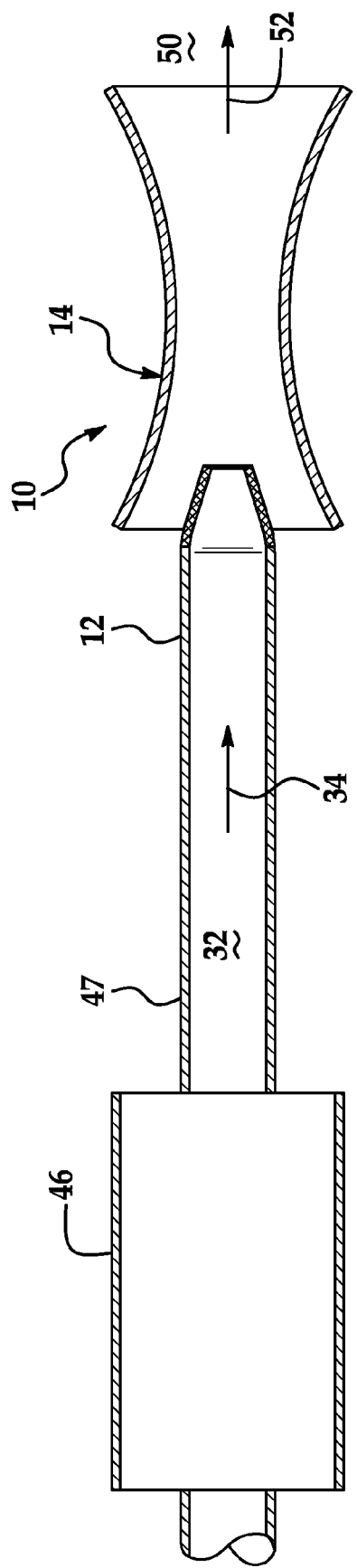
FIG. 4 is a schematic illustration of an exhaust system with an exhaust cooling device in accordance with an exemplary embodiment of the present invention.

Referring now to FIGS. 2-4, schematic views of the exhaust cooling apparatus are illustrated. As shown, the first inlet conduit is coupled to an exhaust of the exhaust gas treatment device via a conduit 47. Of course, first fluid conduit 12 may be directly coupled to the exhaust gas treatment device 46 or any other suitable means for providing fluid communication therebetween may be used for coupling the first fluid conduit to the exhaust gas treatment device. In FIG. 2 the shape memory alloy is in the first position which corresponds to a cool exhaust gas (e.g., less than 550 degrees Celsius) that is flowing through the first fluid conduit. In FIG. 3 the shape memory alloy is in the second position which corresponds to a hotter exhaust gas (e.g., greater than 570 degrees Celsius) that is flowing through the first fluid conduit. Here the hotter gas 34, which is a by-product of a regeneration process of a diesel particulate filter 46, causes the shape memory alloy to deflect toward the center line of the first fluid conduit, thus decreasing the nozzle opening 18 and increasing the inlet opening 30 disposed between the first fluid conduit and the second fluid conduit.

Figure 5:
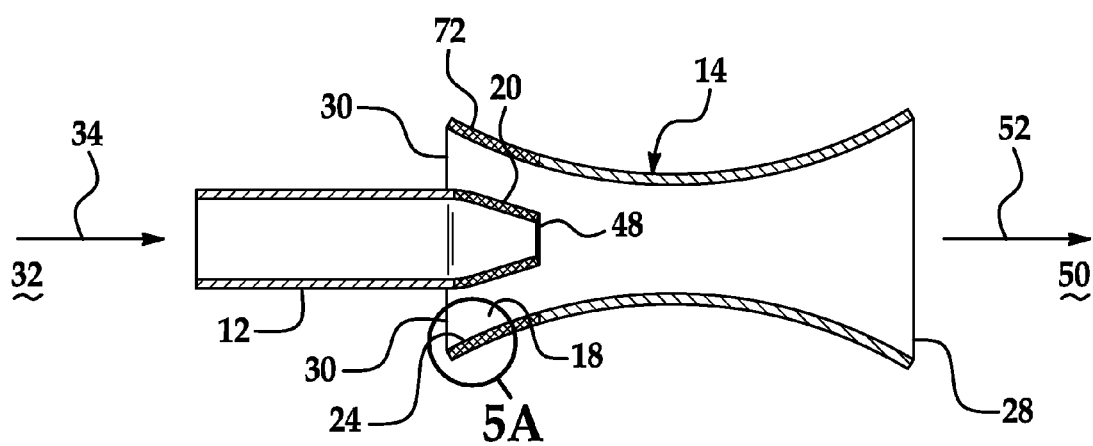
FIG. 5 is a partial cross-sectional view of an exhaust cooling device in accordance with an alternative exemplary embodiment of the present invention.
Figure 5A:
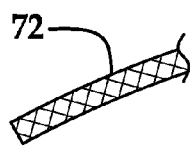
FIG. 5A is an enlarged cross-sectional view of a portion of the exhaust cooling device of FIG. 5 in a first position.

In accordance with an alternative exemplary embodiment of the present invention a second shape memory alloy 72 can also be applied to the inlet end 24 of the outer pipe or second fluid conduit (see for example FIGS. 5 and 5A), to further augment the venturi effects under various operating conditions. Here the second shape memory alloy will be configured to move in a direction opposite to the shape memory alloy of the first fluid conduit. In other words and when the temperature of the exhaust gas flowing through the first fluid conduit increases above a predetermined temperature (e.g., requiring cooling) the shape memory alloy of the first fluid conduit will move toward the center line of the first fluid conduit while the second shape memory alloy will move away from the center line of the first fluid conduit. In still another embodiment, the second shape memory alloy can be configured to react to a different temperature (e.g., lower) than the shape memory alloy of the first fluid conduit since it is further away from the exhaust gas.

In accordance with an exemplary embodiment of the present invention a method for cooling an exhaust gas of an exhaust treatment device of an engine is provided. As discussed herein, the exhaust gas travels through a first fluid conduit having a nozzle opening defined by a shape memory alloy extending from the first fluid conduit. The nozzle opening is received in an inlet end of a second fluid conduit having a venturi tube configuration to define a fluid inlet opening between the first fluid conduit and the second fluid conduit for ambient air to be drawn in and mixed with the exhaust gas in the second fluid conduit to provide a cooled diluted gas that exits the outlet end of the second fluid conduit.

Although, the first and second fluid conduits are illustrated as having circular configurations and openings it is contemplated that any cross-sectional shape for the first and second fluid flow conduits is contemplated as long as the desired results are achieved, non-limiting examples of such configurations include oval, ellipse, square, rectangular and equivalents thereof.

The cooling of the exhaust gas is often desired when there is an emission control device such as a diesel particulate filter, or DPF mounted upstream of the first fluid conduit and in order to maintain efficiency of the DPF the same must periodically regenerate by oxidizing and burning of the accumulated soot or particulate matter contained within the DPF. In doing so, the temperature of the exhaust gas increases.

Although one exemplary embodiment has been described with reference to the vehicular exhaust system, those skilled in the art will recognize that the exhaust cooling apparatus may be used in other applications involving both gaseous and liquid flows. Additionally, the exhaust cooling apparatus may be configured to be an exhaust heating apparatus wherein the shape memory alloy is configured to deflect inwardly when the exhaust gas is cooler than the ambient air thus drawing in a hotter ambient air to the cool exhaust gas.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. An exhaust gas cooling apparatus, comprising:
   a first fluid conduit;
   a variable nozzle defining an opening disposed at one end of the first fluid conduit, the variable nozzle being defined by a shape memory alloy extending from the first fluid conduit; and
   a second fluid conduit having an inlet end and an outlet end, the variable nozzle being disposed in the second fluid conduit proximate to the inlet end of the second fluid conduit such that a fluid inlet opening is disposed about an outer periphery of the variable nozzle and an inner surface of the inlet end of the second fluid conduit, the shape memory alloy varying the size of the variable nozzle opening by moving toward or away from a center line of the first fluid conduit in response to a temperature of an exhaust gas flowing through the first fluid conduit, such that the fluid inlet opening increases in area when the variable nozzle moves toward the center line of the first fluid conduit and the fluid inlet opening decreases in area when the variable nozzle moves away from the center line of the first fluid conduit.

2. The exhaust cooling apparatus as in claim 1, wherein the first fluid conduit is secured to the second fluid conduit by a plurality of stand offs configured to provide flow paths therebetween.

3. The exhaust cooling apparatus as in claim 1, wherein the second fluid conduit further comprises a central portion defining, between the inlet end and the outlet end, a venturi.

4. The exhaust cooling apparatus as in claim 3, wherein the first fluid conduit is secured to the second fluid conduit by a plurality of stand offs configured to provide flow paths therebetween.

5. The exhaust cooling apparatus as in claim 1, wherein the first fluid conduit is configured for attachment to an exhaust pipe of a vehicle exhaust system and an exhaust backpressure in the first fluid conduit increases when the shape memory alloy moves toward the center line of the first fluid conduit and the exhaust backpressure in the first fluid conduit decreases when the shape memory alloy moves away from the center line of the first fluid conduit.

6. The exhaust cooling apparatus as in claim 1, wherein a portion of the inlet end of the second fluid conduit is defined by a second shape memory alloy the second shape memory alloy varying the size of the inlet end of the second fluid conduit by moving toward or away from the center line of the first fluid conduit in response to the temperature of the exhaust gas flowing through the first fluid conduit.

7. The exhaust cooling apparatus as in claim 6, wherein the second fluid conduit further comprises a central portion defining, between the inlet end and the outlet end, a venturi.

8. The exhaust cooling apparatus as in claim 7, wherein the first fluid conduit is secured to the second fluid conduit by a plurality of stand offs configured to provide flow paths therebetween and the second shape memory alloy is configured to move in a direction opposite to the shape memory alloy of the first fluid conduit in response to the temperature of the exhaust gas flowing through the first fluid conduit.

9. An exhaust system for a vehicle, comprising:
   an exhaust pipe for receiving an exhaust gas of an engine of the vehicle;
   an exhaust cooling apparatus for cooling the exhaust gas, the exhaust cooling apparatus comprising:
   a first fluid conduit;
   a variable nozzle opening disposed at one end of the first fluid conduit, the variable nozzle opening being defined by a shape memory alloy extending from the first fluid conduit; and
   a second fluid conduit having an inlet end and an outlet end, the variable nozzle opening being disposed in the second fluid conduit proximate to the inlet end of the second fluid conduit such that a fluid inlet opening is disposed about an outer periphery of the variable nozzle opening and an inner surface of the inlet end of the second fluid conduit, the shape memory alloy varying the size of the variable nozzle opening by moving toward or away from a center line of the first fluid conduit in response to a temperature of an exhaust gas flowing through the first fluid conduit, such that the fluid inlet opening increases in area when the variable nozzle moves toward the center line of the first fluid conduit and the fluid inlet opening decreases in area when the variable nozzle moves away from the center line of the first fluid conduit.

10. The exhaust system as in claim 9, wherein the second fluid conduit further comprises a central portion defining, between the inlet end and the outlet end, a venturi and the variable nozzle opening is defined by a distal end of the shape memory alloy extending from the first fluid conduit, the shape memory alloy being configured such that the shape memory alloy will deflect toward a center line of the first fluid conduit wherein the shape memory alloys decreases the size of the variable nozzle opening and the first fluid conduit is secured to the second fluid conduit by a plurality of stand offs configured to provide flow paths therebetween.

11. The exhaust system as in claim 9, wherein an exhaust backpressure in the first fluid conduit increases when the shape memory alloy moves toward the center line of the first fluid conduit and the exhaust backpressure in the first fluid conduit decreases when the shape memory alloy moves away from the center line of the first fluid conduit.

12. The exhaust system as in claim 9, wherein a portion of the inlet end of the second fluid conduit is defined by a second shape memory alloy the second shape memory alloy configured to vary a size of the inlet end of the second fluid conduit by moving toward or away from the center line of the first fluid conduit in response to the temperature of the exhaust gas flowing through the first fluid conduit.

* * * * *